United States Patent [19]
Broderson

[11] 3,957,193
[45] *May 18, 1976

[54] METHOD FOR CONSTRUCTING AN EASILY STORABLE AWNING

[76] Inventor: John C. Broderson, 3017 W. Almeria, Phoenix, Ariz. 85009

[ * ] Notice: The portion of the term of this patent subsequent to June 3, 1992, has been disclaimed.

[22] Filed: Jan. 9, 1975

[21] Appl. No.: 539,792

Related U.S. Application Data

[63] Continuation-in-part of Ser. No. 474,815, May 30, 1974, Pat. No. 3,886,646.

[52] U.S. Cl. ............................................... 228/182
[51] Int. Cl.² ......................................... B23K 31/00
[58] Field of Search ............... 228/182, 185; 256/34

[56] References Cited
UNITED STATES PATENTS

| | | | |
|---|---|---|---|
| 2,371,754 | 3/1945 | Gillum et al. | 29/471.3 X |
| 3,241,227 | 3/1966 | Bergh | 228/185 |
| 3,551,996 | 1/1971 | Sumner et al. | 29/471.1 X |
| 3,555,665 | 1/1971 | Kelley | 228/185 |
| 3,748,720 | 7/1973 | Versteeg | 29/471.3 |

Primary Examiner—Al Lawrence Smith
Assistant Examiner—James G. Smith
Attorney, Agent, or Firm—Cahill, Sutton & Thomas

[57] ABSTRACT

A method of forming an awning comprising securing longitudinally oriented wires on one side of a length of sheet material and securing laterally oriented wires on the opposite side of the sheet material.

3 Claims, 7 Drawing Figures

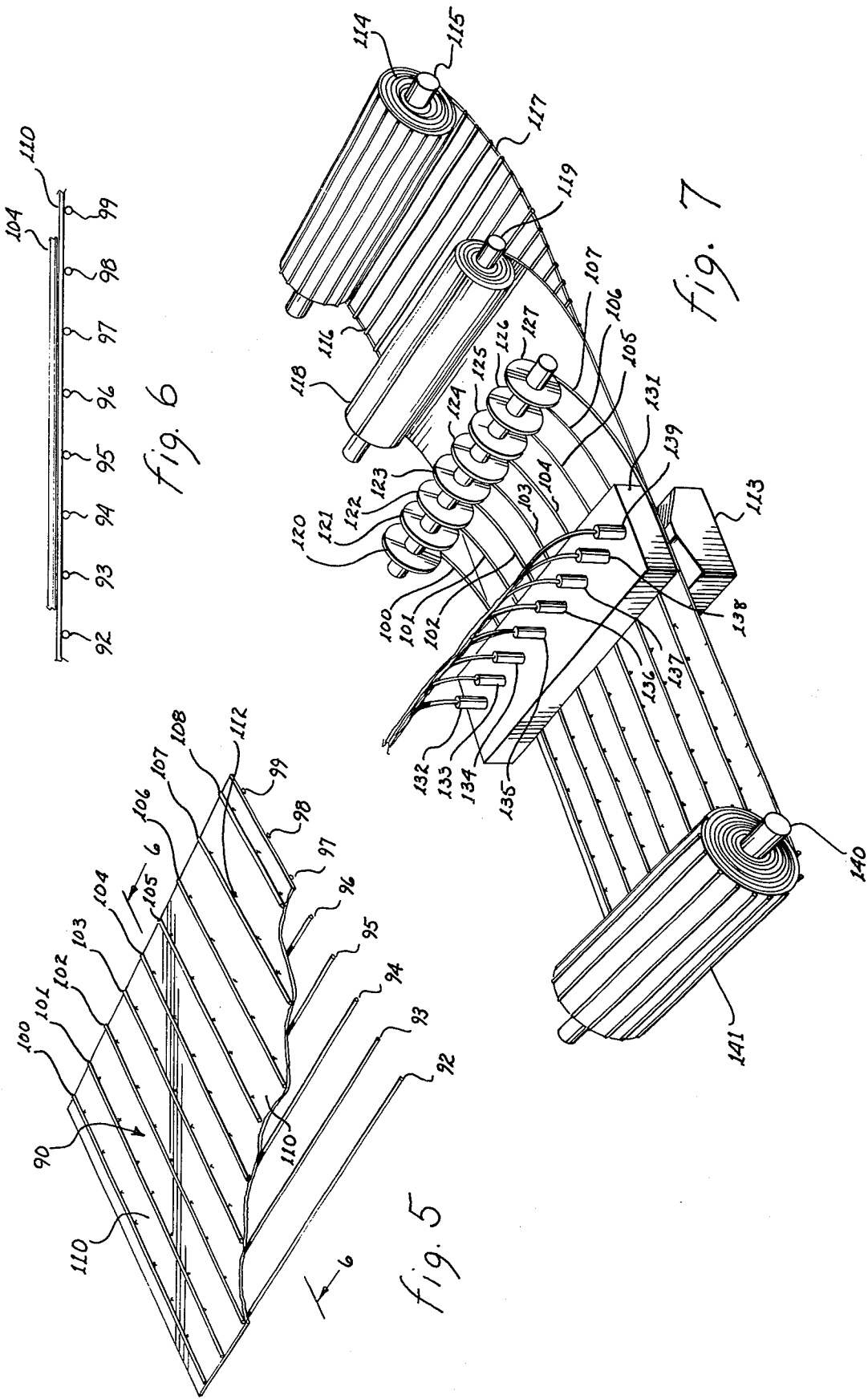

METHOD FOR CONSTRUCTING AN EASILY STORABLE AWNING

The present application is a continuation-in-part application of my application entitled "AWNING AND METHOD FOR CONSTRUCTING SAME", filed on May 30, 1974, and assigned Serial No. 474,815, now U.S. Pat. No. 3,886,646.

The present invention relates to open air over head shelters and, more particularly, to awnings for protecting persons and various articles against the sun and the rain.

Presently, awnings or similar shade and rain protective structures are constructed of relatively heavy gauge essentially rigid metallic elements. These elements may be in the form of interlocking strips or overlapping sheets. Less expensive awnings utilize strips or sheets of plastic or cloth.

Where metallic awnings are used, the installation is essentially always of a permanent nature because of the high installation costs and storage difficulties. The cloth or plastic sheets are used essentially only when temporary or low cost protection is desired. Further, the latter type deteriorates rapidly when exposed to the sun and are often damaged in more than moderate winds.

To satisfy the need for an item falling somewhere intermediate the above enumerated extremes, various devices have been developed. U.S. Pat. No. 3,572,640, teaches the insertion of a plurality of slats within a chain link fence. These slats provide shade and serve as a wind break. However, the use of this device is generally limited to fencing as it offers little protection from rain and is too heavy to use overhead without robust supports. Variations of this device are shown in U.S. Pat. Nos. 2,911,038, 3,069,142, 3,285,577, 3,513,532, 3,712,590 and 3,774,884.

It is therefore a primary object of the present invention to provide an inexpensive storable weather resistant awning.

Another object of the present invention is to provide an awning which may be temporarily or permanently erected at a site.

Still another object of the present invention is to provide an awning which can be manufactured in any given length.

Yet another object of the present invention is to provide an awning which serves as insulation against heat.

A further object of the present invention is to provide an awning easily manufacturable from existing commercially available components.

A still further object of the present invention is to provide an awning which is storable in rolled form without causing damage to the components of the awning.

A yet further object of the present invention is to provide a method for constructing an awning having a sheet of material supported intermediate two sets of wires.

These and other objects of the present invention will become evident to those skilled in the art as the description thereof proceeds.

The present invention may be described with greater specificity and clarity with reference to the following drawings, in which:

FIG. 5 illustrates a cut-away view of a further embodiment of the present invention.

FIG. 6 is a cross-sectional view of the embodiment shown in FIG. 5 and taken aong lines 6—6.

FIG. 7 is a representative illustration of a method for manufacturing the further embodiment of the present invention.

Figure 1:
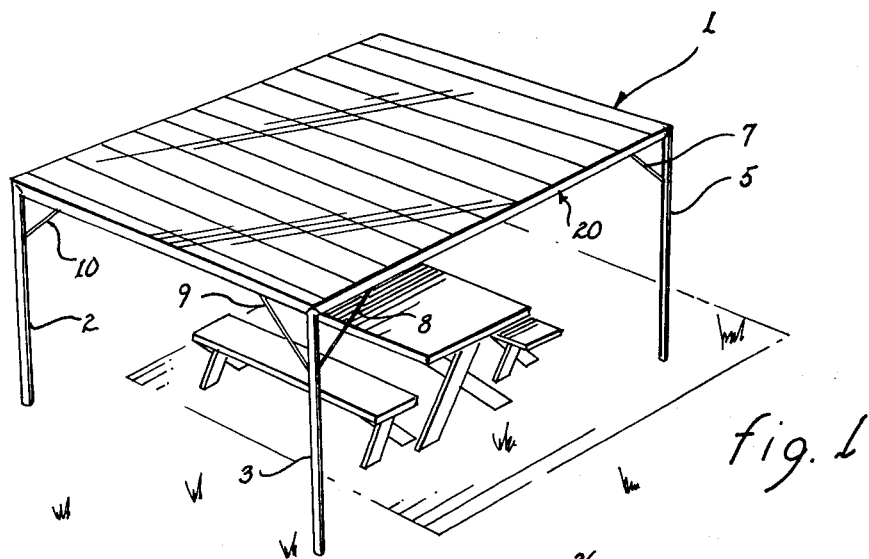
FIG. 1 illustrates the present invention erected over a picnic table and benches.

An awning 1 constructed in accordance with the teachings of the present invention may be used in the open in conjunction with a support structure to protect picnic areas and the like, as shown in FIG. 1. Other uses may include cattle feed lots, outdoor manufacturing complexes, patio covers, car lots, shopping malls and swimming pools. In this configuration, awning 1 may be secured within a framework 20, which framework is supported by a plurality of posts 3, 4 and 5. Additional braces 7, 8, 9 and 10 may be employed intermediate the framework and the posts to ensure rigidity of the supporting structure. In the alternative, it may be laid upon an existing open framework structure to provide protection against the sun and rain. It is to be understood that the structural features of the present invention also permit it to be hung between vertical supports to provide overhead protection.

Figure 2:
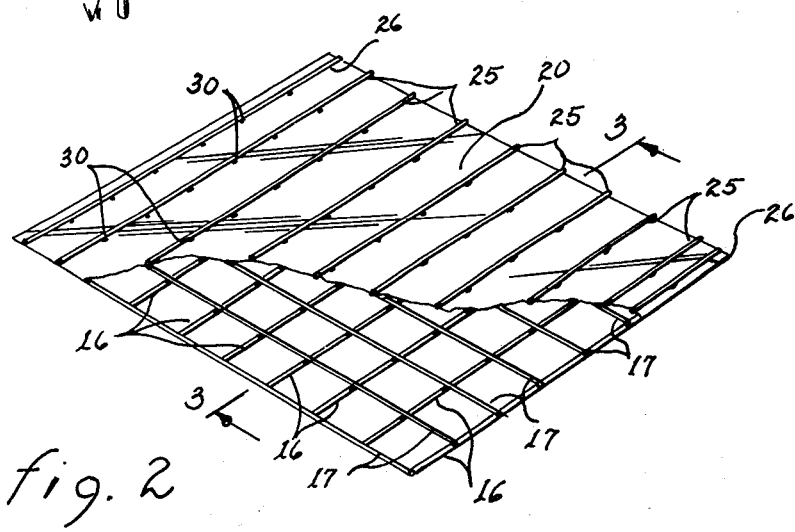
FIG. 2 illustrates a cut-away view of the components of the present invention.
Figure 3:
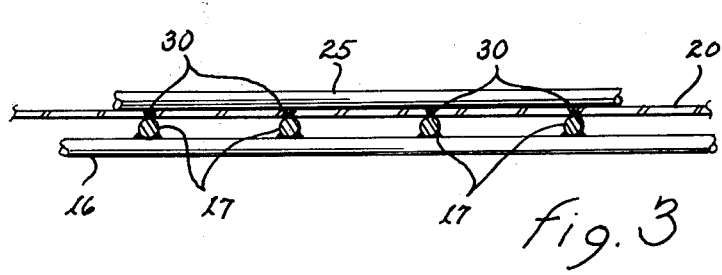
FIG. 3 is a cross-section of the present invention taken along lines 3—3, as shown in FIG. 2.

The elements forming awning 1 will be described in detail with joint reference to FIGS. 2 and 3. The primary supporting element for awning 1 is a readily available wire mesh 15. Such commercially available meshes are generally formed by longitudinally oriented wires 16 intersected by and welded to a plurality of laterally oriented wires 17. The lateral and longitudinal wires define squares of almost any size but is has been found that a four inch mesh is well adapted for use in the present invention. An impervious sheet 20 is laid upon wire mesh 15 and serves as a barrier against the sun and rain. In the preferred embodiment, sheet 20 is of aluminum having sufficient thickness and temper to resist tearing. Those skilled in metallurgy and the related arts can readily determine various commercially available grades of sheet aluminum which are useable in conjunction with the present invention. The use of aluminum also provides the capability for reflecting sunlight and thus serves as a heat shield for the covered activities. With the rapid advances in plastic technology, it may also be feasible to employ plastic sheets, or the like, provided that they do not tear easily and that they are essentially unaffected by the sun's rays.

The sheet 20, whether of aluminum or plastic, is secured to mesh 15 by a plurality of retaining wires 25. Retaining wires 25 are positioned atop sheet 20 parallel to longitudinal wires 16 and positioned essentially intermediate adjacent longitudinal wires. Depending upon the nature of the use for which awning 1 is to be employed, retaining wires 25 may be positioned intermediate each set of adjacent longitudinal wires 16, or spaced apart from one another a distance equivalent to two or more squares of the mesh. It has been found to be expeditious to employ a retaining wire 26 essentially adjacent each edge of sheet 20 regardless of the spacing of the number of retaining wires 25 to prevent the edges of the sheet from flapping or buckling under high wind conditions.

The manner of receiving retaining wires 25 and 26 to mesh 15 may be accomplished by spot welding techniques provided that penetration of sheet 20 can be effected. Both the formation of the weld and an accommodating hole in the sheet 20 can be accomplished by using an arc welder. On energization of the arc welder in proximity to the intersection between the retaining wires 25 and 26 and lateral wires 17, the electrical discharge burns a hole through the sheet 20. Thereafter, a weld 30 is formable through the hole in the conventional manner. The formed weld 30 secures retaining wires 25 and 26 to mesh 15 and locks sheet 20 therebetween such that one surface of the sheet is adjacent the mesh and another surface of the sheet is adjacent the retaining wires.

The number of welds employed may vary depending upon the expected requirements at the point of installation of awning 1. For the greatest strength possible, a weld should be formed at each point of intersection between retaining wires 25 and 26 and lateral wires 17. However, for most applications a lesser number of welds may be adequate.

Figure 4:
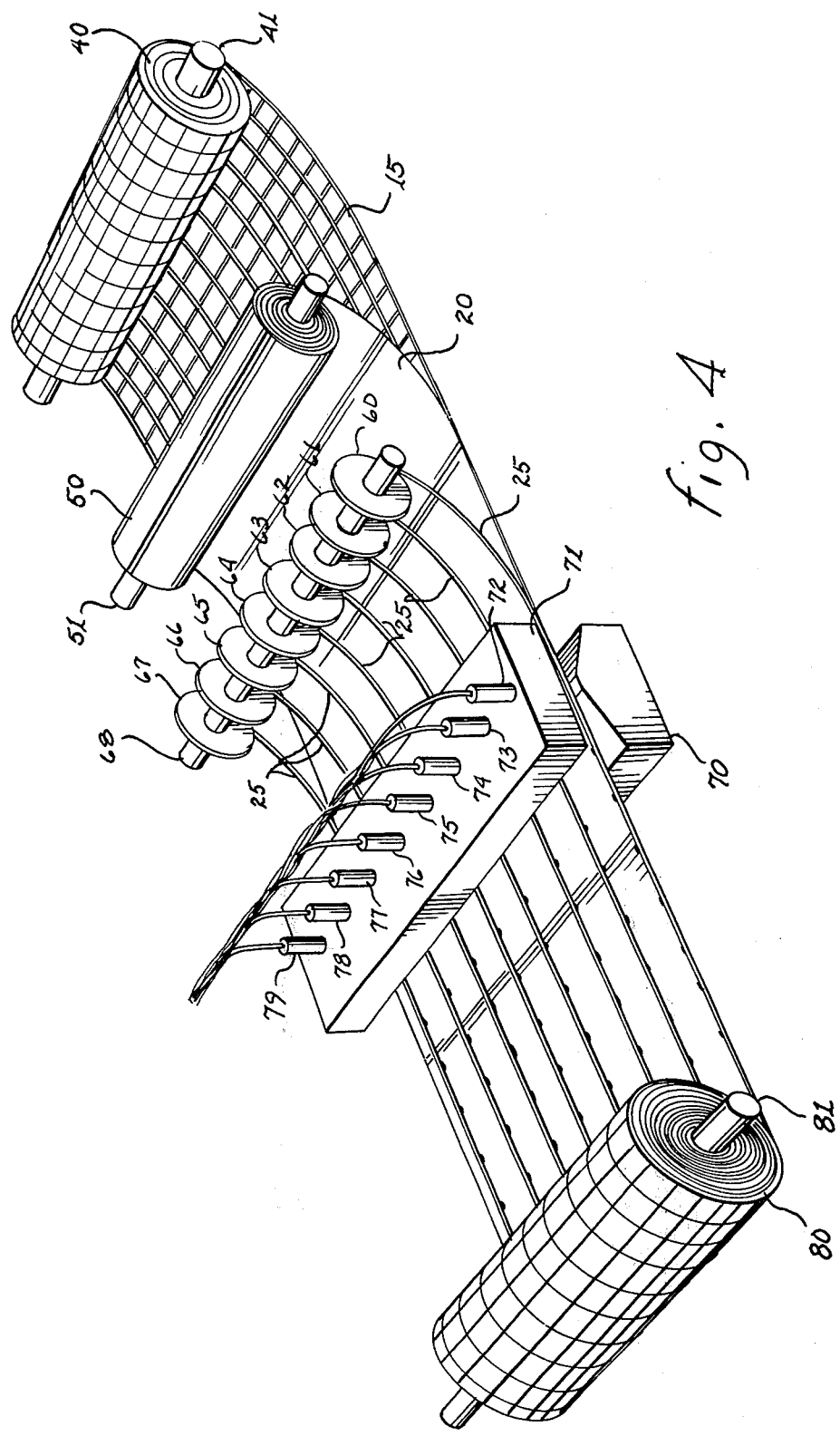
FIG. 4 is a representative illustration of a method for manufacturing the present invention.

Referring now to FIG. 4, a simple method of forming awning 1 will be described. A roll 40 of wire mesh 15 is mounted upon a shaft 41, which shaft is appropriately journalled. The end of wire mesh 15 is transported and drawn across anvil 70. A roll 50 of sheet 20 is mounted upon a shaft 51, which shaft is appropriately journalled. The end of sheet 20 is transported on top of and adjacent mesh 15 to anvil 70. A plurality of spools of wire 60, 61, 62, 63, 64, 65, and 67 are mounted upon a shaft 68, which shaft is appropriately journalled. The ends of each of retaining wires 25 and 26 are drawn across the top of sheet 20 and laterally positioned intermediate longitudinal wires 16 of mesh 15. It is to be understood that the number of retaining wires 25 and 26 which are employed is determined by the strength requirements of the finished product.

A head 71 is positioned above anvil 70 at a spacing sufficient to permit the combination of mesh 15, sheet 20 and retaining wires 25 and 26 to pass therebetween. A plurality of arc welders, or the like, 72, 73, 74, 75, 76, 77, 78 and 79 are mounted within head 71 such that they come into operational contact with respective retaining wires 25 and 26. The number, spacing and energization of the welders is determined by the number of retaining wires to be welded to mesh 15.

In operation, the mesh 15, sheet 20 and retaining wires 25 and 26 are drawn intermediate anvil 70 and head 71 at a predetermined rate. As the combined juxtaposed elements pass beneath the welders, the welders are energized in correspondence with the passage of the lateral wires 17 therebeneath. On energization of the welders, retaining wires 25 and 26 are automatically welded to the lateral wires 17. It may be appreciated that this single welding step permanently mates each of the elements of the awning. The completed awning may then be wound upon an appropriately journalled shaft 81 into a roll 80.

A further embodiment of the awning described above is illustrated in FIGS. 5 and 6. Awning 90 is constructed of a plurality of laterally oriented wires, of which wires 92-99 are illustrated. These wires are essentially of equal length and are oriented parallel with one another. A sheet 110 is laid upon the lateral wires and serves as a barrier against the sun's rays and rain. The sheet is of aluminum having sufficient thickness and temper to resist tearing. The structural characteristics in combination with the capability of reflecting sunlight appears to be a preferred material for sheet 110. However, other materials such as plastic sheeting may be both economical and feasible.

A plurality of longitudinally oriented wires 100-108 are placed upon sheet 110. The longitudinally oriented wires are secured to the laterally oriented wires by means of spot welds at each of the junctions therebetween. The spot welds are collectively identified by numeral 112. Necessarily, an aperture or hole must be formed within sheet 110 in proximity to each of the wire interceptions in order to accommodate structural attachment therebetween. If an arc welder is employed to produce spot welds 112, the heat of the arc welder is sufficient to burn a hole through sheet 110 if the latter is of aluminum or plastic and thereby permit the weld to be formed. Alternatively, sheet 110 may be manufactured with a plurality of apertures disposed therein at locations corresponding to the intersections of the laterally and longitudinally oriented wires. If sheet 110 is formed with a plurality of apertures disposed therein, as discussed above, other attachement means such as adhesives or resins can be employed to effect structural integrity intermediate the laterally and longitudinally oriented wires.

In a yet further modification of a means for securing the laterally and longitudinally oriented wires, it is contemplated that adhesive means could be employed to secure the wires to their respective surfaces upon sheet 110. In such a case, the sheet itself serves as a structural member in retaining the laterally and longitudinally oriented wires in place.

From the above description it may now be appreciated by those skilled in the art that sheet 90 serves as a shield against the elements, which shield is retained intermediate and supported by two sets of wires oriented normal to one another. Thereby, sheet 110 need not have sufficient structural strength to be self-supporting intermediate suspension points, instead, it need only have sufficient structural strength and rigidity to withstand tears and punctures caused by expected weather conditions. The longitudinally oriented wires generally extend between the anchor points; hence, they must be of sufficient tensile strength to withstand the weight of awning 90 and the forces imposed upon it by the expected weather conditions. The laterally oriented wires primarily serve to retain sheet 110 adjacent the longitudinally oriented wires; hence, they need only be sufficiently robust to support and maintain sheet 110 adjacent the longitudinally oriented wires. As the welds or adhesive means are employed to bond the longitudinally oriented wires to the laterally oriented wires, the loads imposed thereupon are relatively minor and can be accommodated by existing technology.

Referring now to FIG. 7, a process for manufacturing awning 90 will be described. A roll 114 of laterally oriented wires are wound about a shaft 115. For the sake of handling convenience, each of the laterally oriented wires are depicted as being supported by a pair of wires or ribbons 116 and 117 disposed at the opposed extremities of the lateral wires. These ribbons simply support the lateral wires and maintain them spaced apart and parallel to one another; it is contemplated that other means may be equally well employed. Ribbons 116 and 117 and the intermediately extending lateral wires are transported past an anvil 113.

A roll 118 of material for forming sheet 110 is mounted upon shaft 119. The sheet material from roll 118 is laid upon the lateral wires and transported therewith across anvil 113.

A plurality of spools 120–127 are mounted upon a shaft 129. One of longitudinally oriented wires 100–107 are unreeled from one of spools 120–129 and placed adjacent the upper surface of the sheet. These longitudinal wires are transported with the sheet across anvil 113. It is to be understood that during manufacture of the present invention, the position of the roll 114 of laterally oriented wires and spools 120–127 of longitudinally oriented wires may be reversed.

A head 131 is positioned above anvil 113 at a spacing sufficient to permit the combination of lateral wires, sheet and longitudinal wires to pass therebetween. A plurality of arc welders, or the like, 133–139, are mounted within head 131 such that one of them comes into operational contact with each of the longitudinal wires 100–107.

In operation, the lateral wires, sheet and longitudinal wires are drawn intermediate anvil 113 and head 131 at a predetermined rate. As the combined juxtaposed elements pass beneath the welders, the welders are energized in correspondence with the passage of the lateral wires therebeneath. On energization of the welders, apertures are burned through the sheet and the longitudinal wires are welded to the lateral wires. It may be appreciated that this single welding step permanently mates each of the elements of awning 90. The assembled awning is then wound upon an appropriately journalled shaft 140 into a roll 141.

By having ribbons 116 and 117 detachably secured to the lateral wires, the ribbons may be readily removed after the awning ribbon has been welded. In the alternative, the ribbons may remain attached to the extremities of the lateral wires to prevent bending of the exposed ends during handling.

From the above description of a manufacturing process for the present invention, it will be appreciated that the length and width of awning 1 or 90 is limited only by the available lengths and widths of the components. Thus, the present invention may be manufactured and marketed as short flat segments, or as rolls of any commercially feasible length.

In many areas, particularly the Southwest, temporary sun shades are mandatory during outdoor activities such as exhibitions, sporting events, or open air sales lots. By using an awning constructed in accordance with the present invention, these shades may be suspended between supports without any intermediate framework. Thus, the expense of erection is minimal and the supporting structure will not intrude upon the activity carried on therebeneath. When the need for the awning ceases, it may be easily demounted and rolled up for storage purposes.

Where a suspended awning is not feasible or where the awning may be required for extended periods of time, a simple framework can be easily erected for support. Again, the awning may be removed intact and the framework dismantled when no longer required. The present invention may, of course, be used for permanent installations.

If the shade needed is of a width greater than that of the manufactured width of the awning, adjacent sections of the awning may be mounted with the edges overlapping one another in the manner of roof tiles. Thus, awnings of any needed width can be assembled from the present invention.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A method for forming an awning of any given width and length, said method comprising the steps of:
   a. transporting a plurality of longitudinally oriented wires through an attaching machine;
   b. placing a length of sheet of material adjacent the longitudinally oriented wires for transportation to the attaching machine;
   c. positioning a plurality of laterally oriented wires adjacent the sheet of material for transportation to the attaching machine; and
   d. attaching the longitudinally oriented wires, the laterally oriented wires and the sheet with the attaching machines to form the unitary structure.

2. The method as set forth in claim 1 wherein said step of attaching comprises the steps of: forming a plurality of holes within the sheet of material at intersections of the longitudinally and laterally oriented wires and welding the longitudinally oriented wires to the laterally oriented wires through the plurality of holes.

3. The method as set forth in claim 2 wherein said step of forming and said step of welding are performed substantially simultaneously.

* * * * *